United States Patent [19]
Marchant et al.

[11] 4,180,628
[45] Dec. 25, 1979

[54] RESIN FOR SORPTION OF TUNGSTEN

[75] Inventors: Wayne N. Marchant; Parkman T. Brooks, both of Salt Lake City, Utah

[73] Assignee: The United States of America as represented by the Secretary of the Interior, Washington, D.C.

[21] Appl. No.: 925,672

[22] Filed: Jul. 18, 1978

[51] Int. Cl.$^2$ .................... B01J 1/08; C08G 14/06
[52] U.S. Cl. .................................. 521/39; 528/162; 423/54
[58] Field of Search .................... 528/162; 521/37; 423/54

[56] References Cited
PUBLICATIONS

AMM–Tungsten Section, Jan. 16, 1976, pp. 16, 18.
Ind. Eng. Chem., vol. 51, No. 6, Jun. 1959, Pennington et al., pp. 759–762.
Awed et al., Tolorta, 1971, vol. 18, pp. 279–285.

Primary Examiner—Joseph L. Schofer
Assistant Examiner—Peter F. Kulkosky
Attorney, Agent, or Firm—William S. Brown; Donald A. Gardiner

[57] ABSTRACT

A resin for sorption of tungsten is prepared by copolymerization of 8-hydroxyquinoline, a polyamine, resorcinol and formaldehyde. The resin finds particular utility for recovery of tungsten from alkaline brines.

6 Claims, No Drawings

RESIN FOR SORPTION OF TUNGSTEN

Natural alkaline brines, such as those of Searles Lake, California, contain about 50 percent of known U.S. tungsten resources, the tungsten being present in concentrations of about 50 to 70 parts per million. Various processes have been proposed for recovery of tungsten from such brines. These include acidulation of the brine, followed by precipitation of tungsten by addition of a metal such as zinc (U.S. Pat. No. 2,962,349); acidulation followed by precipitation of tungsten with 8-hydroxyquinoline, with subsequent purification steps (U.S. Pat. No. 3,065,047); treatment of the brine with $H_2S$, followed by extraction of the resulting thiotungstate into an organic solvent, treatment of the thiotungstate solution with $SO_2$, recovery of the resulting oxytungstate in an alkaline aqueous solution and recovery of the tungsten from this aqueous solution (U.S. Pat. No. 3,806,580). Each of these proposed processes, however, are complex and result in high reagent consumption.

It has now been found, according to the present invention, that tungsten may be simply and efficiently recovered from brines by treatment of the brines with a resin consisting of a copolymer of 8-hydroxyquinoline, a polyamine, resorcinol and formaldehyde. Inclusion of the polyamine component in the resin formulation has been found to substantially improve the mechanical strength, and hence the durability, of the resin in use. In addition, the polyamine component has been found to impart improved selectivity of the resin for sorption of tungsten, the resin of the invention selectively sorbing tungsten from brines containing other dissolved species in concentrations up to 2000-fold greater than that of the tungsten. In particular, the polyamine component results in improved selectivity of tungsten over boron, the latter also being generally found in natural alkaline brines.

The preferred polyamine is ethylenediamine; however, other alkylene polyamines such as diethylenetriamine, triethylenetetramine and tetraethylenepentamine, or combinations thereof, may be employed and may provide the resin with superior specific properties, as indicated in the examples below.

The resin of the invention is prepared by conventional polymerization procedures of the type employed in preparation of resins of the phenol-formaldehyde type, such as described, e.g., by L. D. Pennington and M. B. Williams in "Chelating Ion Exchange Resins," *Ind. and Eng. Chem.*, v. 51, no. 6, page 759 (1959). The polymerization reaction is carried out in aqueous media using a base catalyst. The base is preferably sodium hydroxide, but other bases such as potassium hydroxide may also be used. The base is used in an amount to provide a pH of about 12 to 14, with optimum pH depending on the specific reactants, proportions, etc. It has been found that use of a base, rather than acid, catalyst is essential for production of a gel that is suitable for curing and subsequent crushing to optimum particle size in preparation of the sorbent material, as described below. Acid catalysis has been found to produce either a fine powder or a dense solid that reduced to a powder when crushed, and is thus not suitable for preparation of the sorbents of the invention.

Proportions of the monomers used in preparation of the resin are generally not critical. However, it has been found that, although suitable amounts of the polyamine are effective in producing the above-mentioned improved strength and selectivity, excessive amounts of polyamine may produce powders of the type discussed above which are not suitable for the intended use. Generally, proportions of about 0.1 to 0.5 moles of polyamine, about 0.8 to 1.5 moles of resorcinol and about 6 to 9 moles of formaldehyde per mole of 8-hydroxyquinoline will give satisfactory results, with optimum proportions depending on the specific polyamine, polymerization reaction conditions, intended use of the resin, etc.

It has been found that optimum results are generally achieved by carrying out the polymerization reaction in two stages, the first stage consisting of reaction of the 8-hydroxyquinoline with the polyamine and a portion, e.g., approximately half, of the formaldehyde. This stage of the reaction is suitably carried out at about room temperature or below for a period of about 45 to 90 minutes, and results in formation of a clear solution of polymer in the reaction media. It has also been found that the temperature of this stage of the reaction should be kept below about 45° C., preferably below about 25° C., since higher temperatures generally result in formation of the above-discussed powder form of the polymer which does not provide a satisfactory sorbent material. Since the reaction is exothermic, maintenance of a suitable temperature will generally require use of a conventional cooling means, such as ice.

The second stage of the polymerization reaction is carried out by addition of the resorcinol, preferably in aqueous solution, the balance of the formaldehyde and additional base as necessary to maintain the proper pH. Gentle heating, e.g., on a hot-water bath, at a temperature of about 35° to 75° C. for a period of about 5 to 20 minutes results in formation of a firm gel. This gel, generally after cutting into pieces of convenient size, is cured at a temperature of about 80° to 115° C. for a period of about 4 to 40 hours to complete the polymerization reaction.

The cured resin is readily reduced to a suitable particle size by any conventional means such as grinding. Optimum particle size will depend on the specific composition of the resin and the tungsten-containing brine feed solution, and on the type of sorption process employed, e.g., a batch process involving agitation of an admixture of feed and resin, or a process involving use of the resin as sorbent in an ion exchange column. Generally, however, a resin fraction passing a No. 20 sieve and retained on a No. 35 sieve is effective for sorption of tungsten, particularly from natural alkaline brines. After size reduction, the resin is preferably washed with water, and acid or alkali or a combination thereof, to remove any salts formed in the polymerization reaction as well as any unreacted monomer. It is then preferably treated for removal of excess surface water by any conventional means such as filtration on a suction filter and moderate air drying at room temperature.

Since the resins of the invention generally have specific gravities of about 1.7, as compared to about 1.3 for the feed brines, they do not float in the brines and are therefore well suited to batch processes in which the resin and feed are simply admixed for a period of time to permit sorption of the tungsten, followed by filtration to recover the loaded resin. Recovery of tungsten from the resin is by conventional means such as elution with water or a dilute solution of alkali metal carbonate, e.g., sodium carbonate. As mentioned above, the resins of the invention are also well suited to use in conventional static ion exchange columns in which sorption of the tungsten is achieved by passing the feed brine through a column of the resin. In fact, one of the major advantages of the resins of the invention is that where the feed consists of an alkaline brine, i.e., one having a pH of about 7.5 to 10, tungsten may be readily recovered from loaded resin in a column by elution with water which may be purified water, ordinary potable water or brackish water. This is in contrast to most elution processes in which the use of acid or alkaline solutions is required for elution of sorbed metal values. If, however, the pH of the feed solution is less than about 7.5, tungsten is generally more effectively eluted with diluted alkali, such as sodium carbonate solution at a concentration of about 0.1 to 5 percent by weight.

The resins of the invention are effective for sorption of tungsten from natural alkaline brines such as the above-mentioned Searles Lake brine. This is a naturally occuring, dense, saturated brine containing, in percent, approximately 3.0 KCl, 16 NaCl, 6.3 $Na_2CO_3$, 1.8 $Na_2B_4O_7$, 7.0 $Na_2SO_4$, 0.006 $WO_3$, and minor amounts of various other salts totaling about 35 percent by weight. The pH of this brine is about 9.5 to 10.

The resins are also effective for recovery of tungsten from brines from other sources such as process effluent or in-process streams at chemical plants treating raw brine for recovery of various salts. Such sources are typified by effluent from plants in which borax and soda ash are recovered from natural brines, such as Searles Lake brine, after first carbonating the brine, a process which does not remove tungsten. The carbonation in such a process reduces the brine alkalinity to a pH of about 7 to 8.5. Alkalinity of the naturally occurring brines may also be reduced by addition of an acid such as sulfuric or hydrochloric acid, which generally improves tungsten extraction. However, as mentioned above, a lower pH tends to reduce the effectiveness of water elution.

The following examples will more specifically illustrate the preparation and use of the resins of the invention.

EXAMPLE 1

8-hydroxyquinoline (145 g; 1 mole) was added in portions with stirring to 750 ml 2 N NaOH, forming a thick yellow slurry. To this was added ethylenediamine (40 ml; 0.6 mole) followed by 325 ml 37 percent formaldehyde solution (4.2 moles HCHO). The mixture was stirred and maintained at room temperature for 1 hour, producing a clear, amber solution. Over a 10-minute period, resorcinol (110 g; 1 mole) dissolved in 625 ml 2 N NaOH was added with stirring, followed by 375 ml 37 percent formaldehyde solution (4.9 moles HCHO). Gentle heating on a hot-water bath produced a firm gel in approximately 20 minutes. This was cut into pieces and cured for 4 hours at 100° to 105° C., then 16 hours at 80° to 85° C. The cured resin was ground in a mortar and the fraction passing a No. 20 sieve and retained on a No. 35 sieve was retained. This fraction was washed extensively with water, then sequentially in 1 N $H_2SO_4$, water, 1 N NaOH, and finally water until the wash water was nearly neutral. The final product was hard, granular, and translucent to bright light.

EXAMPLE 2

The resin product of Example 1 was tested for sorption of tungsten as follows: 2 g of resin (moist weight) was stirred for 1 hour with 20 ml of brine prepared by carbonating Searles Lake brine to a pH of about 8.5. It contained 70 ppm of $WO_3$ and was labeled with $Na_2^{181}WO_4$ tracer. The resin and brine were separated by filtration and the tungsten remaining in the filtrate was determined radiometrically to be 7 ppm which corresponds to sorption of 90 percent of the tungsten by the resin.

EXAMPLE 3

A series of resins analogous to that in Example 1 was prepared in which the polyamine component was varied. The preparative procedure in Example 1 was followed using a polyamine having the general formula $H_2N-(CH_2CH_2NH)_n-CH_2CH_2NH_2$ with n=0, 1, 2, and 3. Each of these resins was tested for sorption of tungstate and borate from brine as follows: 5.0 g of resin (dry weight basis) was agitated gently on an orbital shaker for 1 hour with 50 ml of the brine of Example 2 containing 70 ppm $WO_3$ and $Na_2^{181}WO_4$ radiotracer. After filtration to separate resin and brine, the tungstate remaining in the filtrate was determined radiometrically. Borate was determined by atomic absorption spectrophotometry. The results are shown in Table 1.

Table 1.

| Polyamine component of resin (n) | Removal, pct $WO_3$ | $B_4O_7$ | Ratio of removal pct $WO_3$:pct $B_4O_7$ |
|---|---|---|---|
| n = 0 (ethylenediamine) | 87.2 | 17.2 | 5.1 |
| n = 1 (diethylenetriamine) | 86.7 | 20.7 | 4.2 |
| n = 2 (triethylenetetramine) | 81.8 | 14.9 | 5.5 |
| n = 3 (tetraethylenepentamine) | 72.2 | 10.3 | 7.0 |

Thus, substantial selectivity of the resin for tungstate is achieved by including a polyamine in the polymer. It will be noted that tetraethylenepentamine provided the best selectivity, although the percent recovery of tungsten was less.

EXAMPLE 4

The resins described in example 3 were tested to measure their resistance to attrition from mechanical causes. A screen analysis was obtained on 5.0 g of dry resin after which the resin was recombined and agitated together with three steel balls for 2 minutes at high speed in a blending mill. A second screen analysis was then performed. The results are shown in Table 2.

Table 2

| Polyamine component of resin | Sieve analysis before test | | | | Sieve analysis after test | | | |
|---|---|---|---|---|---|---|---|---|
| | Retained on sieve No. pct | | | Passing, pct | Retained on sieve No., pct | | | Passing, pct |
| | 40 | 60, | 100 | 100 | 40 | 60 | 100 | 100 |
| ethylenediamine | 92.4 | 7.4 | 0.2 | Nil | 42.7 | 31.4 | 10.7 | 15.2 |
| diethylenetriamine | 89.2 | 9.7 | 1.1 | Nil | 40.5 | 31.5 | 12.3 | 15.7 |
| triethylenetetramine | 90.9 | 8.2 | 0.6 | 0.2 | 52.8 | 27.4 | 9.3 | 10.5 |
| tetraethylenepentamine | 91.8 | 7.8 | 0.4 | Nil | 52.9 | 27.4 | 10.2 | 9.5 |
| No polyamine component | 88.0 | 11.0 | 0.9 | Nil | 30.6 | 34.0 | 13.9 | 21.5 |

Thus, in addition to selectivity for tungstate, those resins containing a polyamine component exhibit greater resistance to mechanical failure, as evidenced by the higher precentages of resin retained on the coarser screens after the test and the lower percentages which were reduced to finer than No. 100-mesh by the test.

Where the resins of the invention are employed in static ion exchange columns, optimum process conditions may vary considerably and are best determined experimentally. However, the following will generally be satisfactory: a brine feed rate of about 0.1 to 5 gpm/ft$^2$, an elution flow rate of about 0.05 to 5 gpm/ft$^2$, a brine feed temperature of about 20° to 40° C., with about 25° C. generally being preferred. In a continuous countercurrent mode, using an expanded bed ion exchange column, the flow rate must be adequate to permit transport of the resin between stages of segmented columns. About 60 percent bed expansion is suitable during loading; however, less than 60 percent is preferred during elution, with more concentrated tungsten-containing eluate resulting from low liquid flow rates in the elution column.

EXAMPLE 5

Four identical 50 gram portions of the resin of Example 1 were placed in glass columns 1.5 cm in diameter. Each portion was then subjected to a single load-elution cycle consisting of loading from 18 bed-volumes of brine of the type employed in Example 2 containing 70 ppm dissolved WO$_3$ at the pH indicated below, followed by elution with 4.5 bed volumes of tap water. The acidity of those feed sources having a pH below 8.5 were adjusted using carbon dioxide. The solution flow rate during loading and elution was 1 gallon per minute per square foot of resin bed cross section area. Results are shown in Table 3.

Table 3

| Brine pH | Tungsten sorbed, mg | Tungsten sorbed as percent of tungsten present in feed | Tungsten eluted, mg | Percent of sorbed tungsten recovered by elution |
| --- | --- | --- | --- | --- |
| 8.5 | 37 | 42.5 | 35 | 94.6 |
| 8.0 | 65 | 73.0 | 57 | 87.7 |
| 7.5 | 67 | 73.6 | 56 | 83.6 |
| 7.0 | 85 | 98.8 | 45 | 52.3 |

EXAMPLE 6

Brine of the type employed in Example 2 containing 70 ppm dissolved tungsten (as WO$_3$) was adjusted to pH 7.0 with sulfuric acid and pumped through a 1-inch inside diameter, 40-inches tall column of the resin of Example 1 at 1 gpm/ft$^2$. After collection of 53.1 liters of effluent (106 bed-volumes) the tungsten concentration in the effluent was 3.5 ppm, indicating that 95 percent of the tungsten was still being removed by the resin. A total of 98.6 percent of the tungsten was removed from 53.1 liters of brine. Elution with a 1 percent solution of Na$_2$CO$_3$ at a flow rate of 1 gpm/ft$^2$ enabled collection of 98.5 percent of the sorbed tungsten in 2.0 liters of eluate containing 1.5 grams of tungstate per liter. Thus, a 21-fold increase in tungsten concentration was achieved.

EXAMPLE 7

In an automated test routine, a 1-inch inside diameter, 6.5-inches deep column of the resin of Example 1 was subjected to 105 consecutive load-elution cycles. In each cycle, 18 bed-volumes of the brine of Example 2 containing 70 ppm of tungstate was pumped through the resin, followed immediately by 4.5 bed volumes of tap water. The feed rate during loading and elution was 1 gpm/ft$^2$. Tungsten sorption averaged 38.7 ±2.5 percent per cycle. Better than 98 percent of the tungsten was eluted in each cycle.

EXAMPLE 8

Resin in a continuous countercurrent ion exchange experiment enabled tungsten sorption in one column and tungsten elution in a second column. The apparatus used was similar to the Bureau of Mines multi-compartment countercurrent ion exchange assembly described in U.S. Pat. No. 3,773,889. A pH 8.3 brine containing 70 ppm of tungstate was pumped upward thorough a 1.5-inch inside diameter, 36-inches tall segmented glass column containing the resin of Example 1. Loaded resin was pumped to the top of a 1-inch inside diameter, 36-inches tall segmented glass column where it was eluted by tap water. The system was operated under the following conditions:

(1) Brine feed rate: 2.3 gpm/ft$^2$
(2) Water feed rate: 0.34 gpm/ft$^2$
(3) Volumetric brine-to-resin ratio during loading: 25

In this test, 32 percent of the influent tungsten was continuously sorbed from the brine, and water eluted all of the sorbed tungsten to produce eluate containing 0.34 grams per liter WO$_3$. The brine feed contained, typically, 42 percent solids by weight, whereas, the eluate contained, typically, less than 2 percent solids by weight, including the recovered tungsten.

Recovery of tungsten from ion exchange process eluate may be by methods such as (1) acidulation, with heating, to precipitate tungstic acid, (2) precipitation as an insoluble tungstate, such as calcium tungstate, (3) coprecipitation with a metal hydroxide, such as iron hydroxide, or (4) by any of methods (1), (2), or (3) after further concentrating the tungsten by known methods such as evaporation, a second ion exchange operation, or by solvent extraction using organic amines as described, for example, by Churchward, P. E. and D. W. Bridges—Tungsten Recovery from Low-Grade Concentrates by Amine Solvent Extraction—BuMines RI 6845, 1966.

Although the resins of the invention have been found particularly useful for recovery of tungsten from brines, as illustrated in the Examples, they are not limited to such utility, but are generally applicable to recovery of tungsten from aqueous solutions. It has been found, e.g., that tungsten can be efficient sorbed from an aqueous solution containing only tungstate and sodium tetraborate, with the capacity of the resin increasing with increasing tungstate concentration.

We claim:

1. A method for preparation of a resin suitable for sorption of tungsten from aqueous solution comprising copolymerizing at a temperature of about 35° to 75° C. (1) 8-hydroxyquinoline, (2) about 0.1 to 0.5 moles of a polyamine from the group consisting of ethylenediamine, diethylenetriamine, triethylenetetramine and tetraethylenepentamine per mole of the 8-hydroxyquinoline, (3) about 0.8 to 1.5 moles of resorcinol per mole of the 8-hydroxyquinoline and (4) about 6 to 9 moles of formaldehyde per mole of the 8-hydroxyquinoline, the polymerization being carried out in aqueous media containing sufficient base to provide a pH of about 12 to 14, for a time sufficient to form a firm gel of the copolymer, and subsequently curing said gel at a temperature of about 80° to 115° C. for a time sufficient to complete the polymerization reaction.

2. The method of claim 1 in which the polyamine is ethylenediamine.

3. The method of claim 1 in which the base is sodium hydroxide.

4. The method of claim 1 in which the polymerization reaction is carried out in two stages, the first stage consisting of reaction of the 8-hydroxyquinoline with the polyamine and a portion of the formaldehyde to form a polymer solution, and the second stage consisting of reaction of said polymer solution with the resorcinol and the balance of the formaldehyde.

5. The method of claim 4 in which the first stage of the polymerization reaction is carried out at a temperature below about 45° C.

6. A resin prepared by the method of claim 1.

* * * * *